2 Sheets--Sheet 1.

J. B. BRENNAN & W. TUCKER.

Middlings Separators.

No. 5,970. Reissued July 14, 1874.

WITNESSES.

A. Gebner

R. Lenzinger

INVENTOR.

John B Brennan

William Tucker

BY Cox and Cox their ATTY'S

THE GRAPHIC CO. PHOTO-LITH. 38 & 41 PARK PLACE, N.Y.

2 Sheets--Sheet 2.

J. B. BRENNAN & W. TUCKER.

Middlings Separators.

No. 5,970. Reissued July 14, 1874.

WITNESSES.

R. Gebner

R. Zeyinger

INVENTOR.

John B. Brennan

William Tucker

BY Cox and Cox THEIR ATTY'S

THE GRAPHIC CO. PHOTO-LITH. 39 & 41 PARK PLACE, N.Y.

UNITED STATES PATENT OFFICE.

JOHN B. BRENNAN AND WILLIAM TUCKER, OF PARIS, ILLINOIS.

IMPROVEMENTS IN MIDDLINGS-SEPARATORS.

Specification forming part of Letters Patent No. 120,706, dated November 7, 1871; reissue No. 5,970, dated July 14, 1874; application filed June 22, 1874.

*To all whom it may concern:*

Be it known that we, JOHN B. BRENNAN and WILLIAM TUCKER, both of Paris, in the county of Edgar and State of Illinois, have made and invented certain new and useful Improvements in Middlings-Separators, of which the following is a specification:

Our invention relates to that class of machines which is used for the purpose of separating middlings or the coarser parts of flour, and consists of certain improvements in the details of construction of the same hereinafter shown and described.

Figure 1:
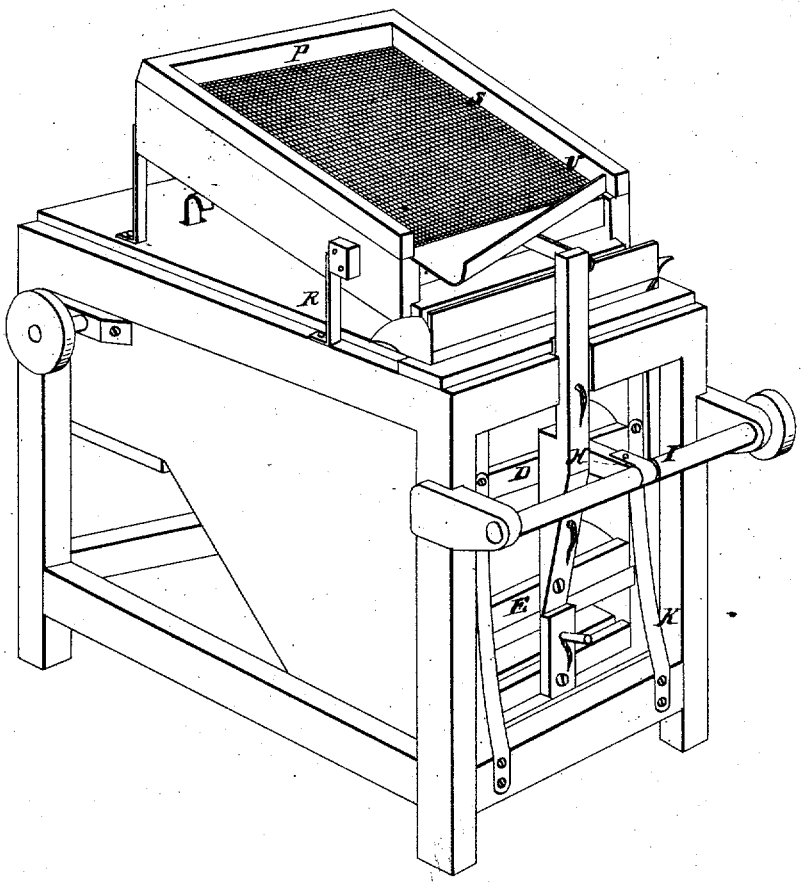
Figure 2:
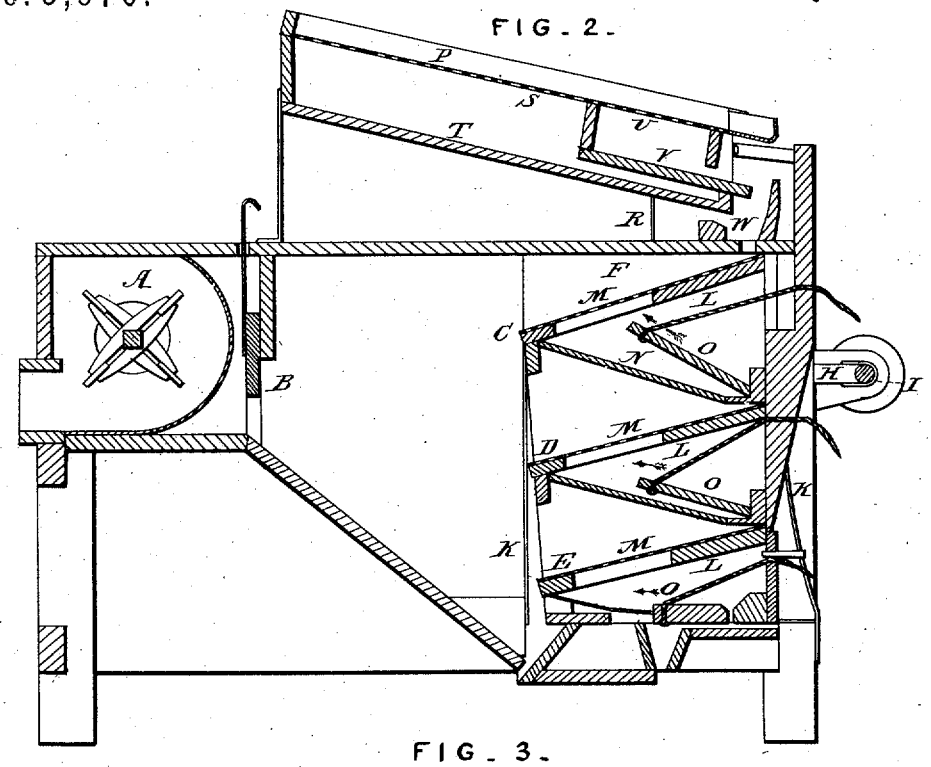
Figure 3:
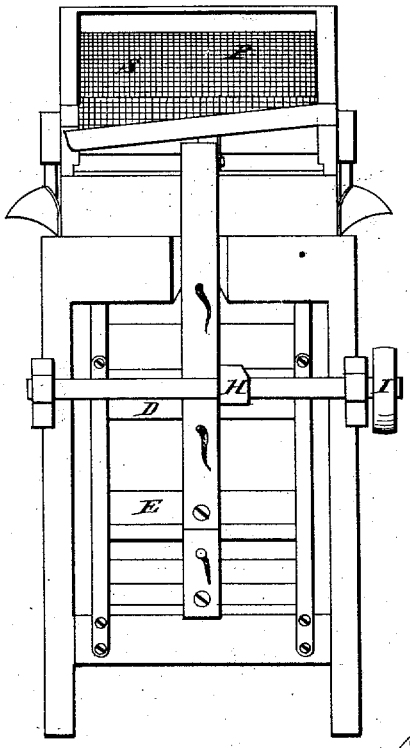

In the accompanying drawings, Figure 1 is a perspective view; Fig. 2, is a longitudinal vertical section; Fig. 3, is a rear elevation.

The construction, operation, and relative arrangement of the component parts of our invention are as follows: In the front of the machine is the suction-fan A, so arranged as to draw the air from the rear, immediately back of which is the slide-valve B, by means of which the draft is regulated. In the rear of the machine are arranged the sieves C D E, in the present instance three in number, within the frame F, which is connected by means of the connecting-rod H with an eccentric upon the transverse shaft I, the rotation of which causes the frame containing the sieves to reciprocate upon the springs K. The said sieves are inclined downward, toward the fan A, and formed partly of solid pieces L and partly of bolting-cloth or perforated material M, so that after the middlings pass through one sieve they are carried back by the inclined pieces N in such a manner as to pass through the others until they reach the hopper under the frame, from whence they pass out of the machine. The object of forming part of the said sieves or screens of solid pieces is to allow the bran or light stuff to shake to the top after falling and pass down the incline more rapidly than the heavier portion, so that when it comes to the part that is perforated, where there is a current of air drawn by the fan, it is taken up and carried over the end of the sieve, while the heavy middlings pass to the next sieve below.

It is to be observed that by so constructing the machine that the air is drawn through the parts M from below a very effective agitation of the material being acted upon is accomplished. And to insure this important result the suction-fan A, and other parts, are so constructed that the air is necessarily drawn through the parts M, no other way of escape toward the fan being provided.

Under each sieve or screen aforesaid, in the present instance hinged to the frame thereof, are the valves O, which are arranged so that they may be adjusted at will so as to regulate the drafts upon the several sieves or screens according to the quantity of material that is being separated, and other circumstances. Usually the top screen will require less draft than the middle or lower ones, in which event the top valve will be carried up so as to direct the air toward the solid part of the screen, while the lower valves will be opened to a greater or less degree to permit of a stronger current.

In Fig. 2 the valves O are shown with sufficient particularity to explain their offices, the direction of the currents of air being shown by the arrows.

On the top of the machine is the upper sieve, P, which is attached to the lower frame by the springs R, and operated by means of the connecting-rod, to which vibratory motion is imparted by the shaft. The bran and middlings are fed in at the upper end of the sieve P, and as they pass downward the fine middlings fall through the fine screen S upon the bottom T, and are carried down to the lower end thereof where they are discharged through a spout and carried off, while the coarse middlings and bran pass down to the coarse screen U, fall on the carrier-board V, and are fed into the hopper W on the top of the machine, where they drop upon the sieve or screen C, above described.

Having thus set forth our invention, what we claim as new and useful, and desire to secure by Letters Patent, is—

1. In a middlings-separator, the combination of one or more sieves having the perforated and unperforated parts M and L, valve or valves O, and suction-fan A, when constructed and arranged to operate substantially in the manner and for the purposes specified.

2. The combination of the sieve P, frame F, valves O, inclined chutes N, and sieves C D E, constructed with the perforated and unperforated parts M and L, substantially as and for the purpose described.

JOHN B. BRENNAN.
WILLIAM TUCKER.

Witnesses as to JOHN B. BRENNAN:
ROWLAND COX,
DENNIS TINNEY.
Witnesses as to WILLIAM TUCKER:
WM. B. SHERIFF,
HARRY BOOTH.